D. E. LAWRENCE.
COMBINED PLANTER AND FERTILIZER DISTRIBUTER.
APPLICATION FILED AUG. 18, 1910.

977,886.

Patented Dec. 6, 1910.

4 SHEETS—SHEET 1.

D. E. LAWRENCE.
COMBINED PLANTER AND FERTILIZER DISTRIBUTER.
APPLICATION FILED AUG. 18, 1910.

977,886.

Patented Dec. 6, 1910.
4 SHEETS—SHEET 3.

Witnesses

Inventor
D. E. Lawrence
By
Attorney

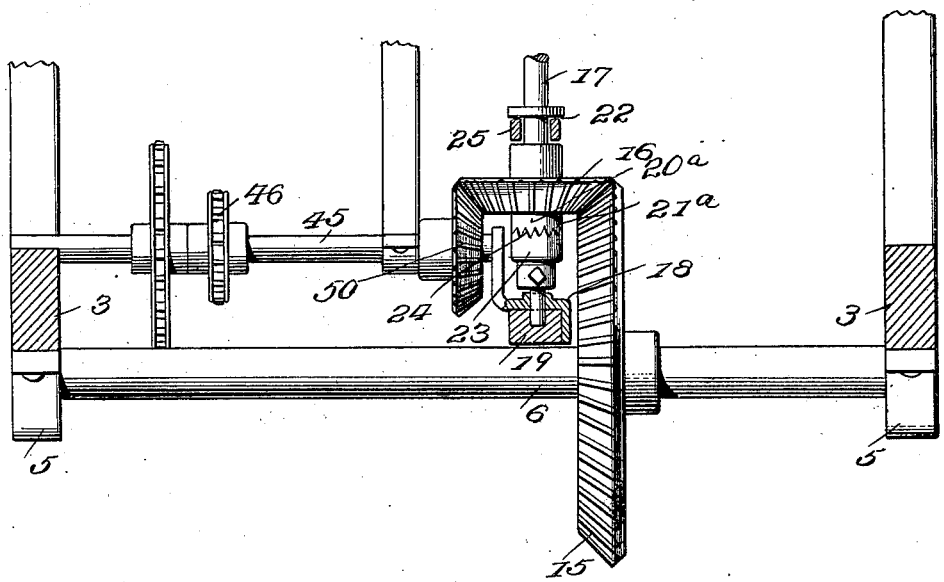
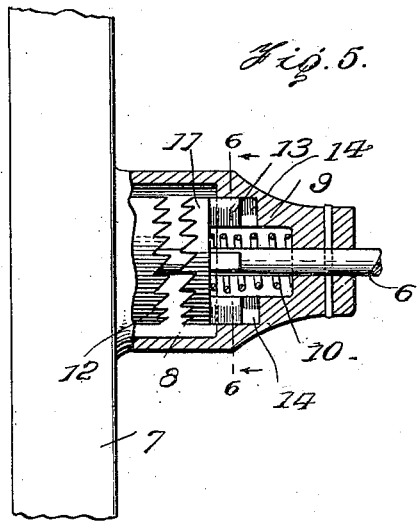
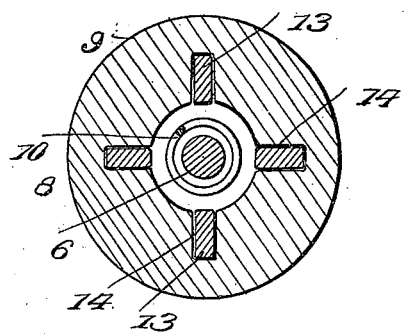

UNITED STATES PATENT OFFICE.

DAVID E. LAWRENCE, OF CENTRAL, SOUTH CAROLINA.

COMBINED PLANTER AND FERTILIZER-DISTRIBUTER.

977,886.

Specification of Letters Patent.

Patented Dec. 6, 1910.

Application filed August 18, 1910. Serial No. 577,781.

*To all whom it may concern:*

Be it known that I, DAVID E. LAWRENCE, a citizen of the United States, residing at Central, in the county of Pickens and State of South Carolina, have invented certain new and useful Improvements in Combined Planters and Fertilizer Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a combined planter and fertilizer distributer.

The object of the invention is to provide means for pulverizing compost and mixing acid, cotton seed meal, or other fertilizer and delivering the same in a mixed condition to the soil about the time the corn, peas, or other seed are delivered whereby to enrich the ground and promote the growth of the plants.

A further object of the invention is to provide a series of hoppers in an organized combined planter and fertilizer distributer whereby the fertilizing material may be mixed and the seed spout arranged in alinement with the fertilizer spout, and to provide means to shift the same so that planting may be done in the middle or to one side of the apparatus.

The invention also relates to the specific details of construction and arrangement of parts which will be hereinafter described and particularly pointed out in the claims.

Figure 1:
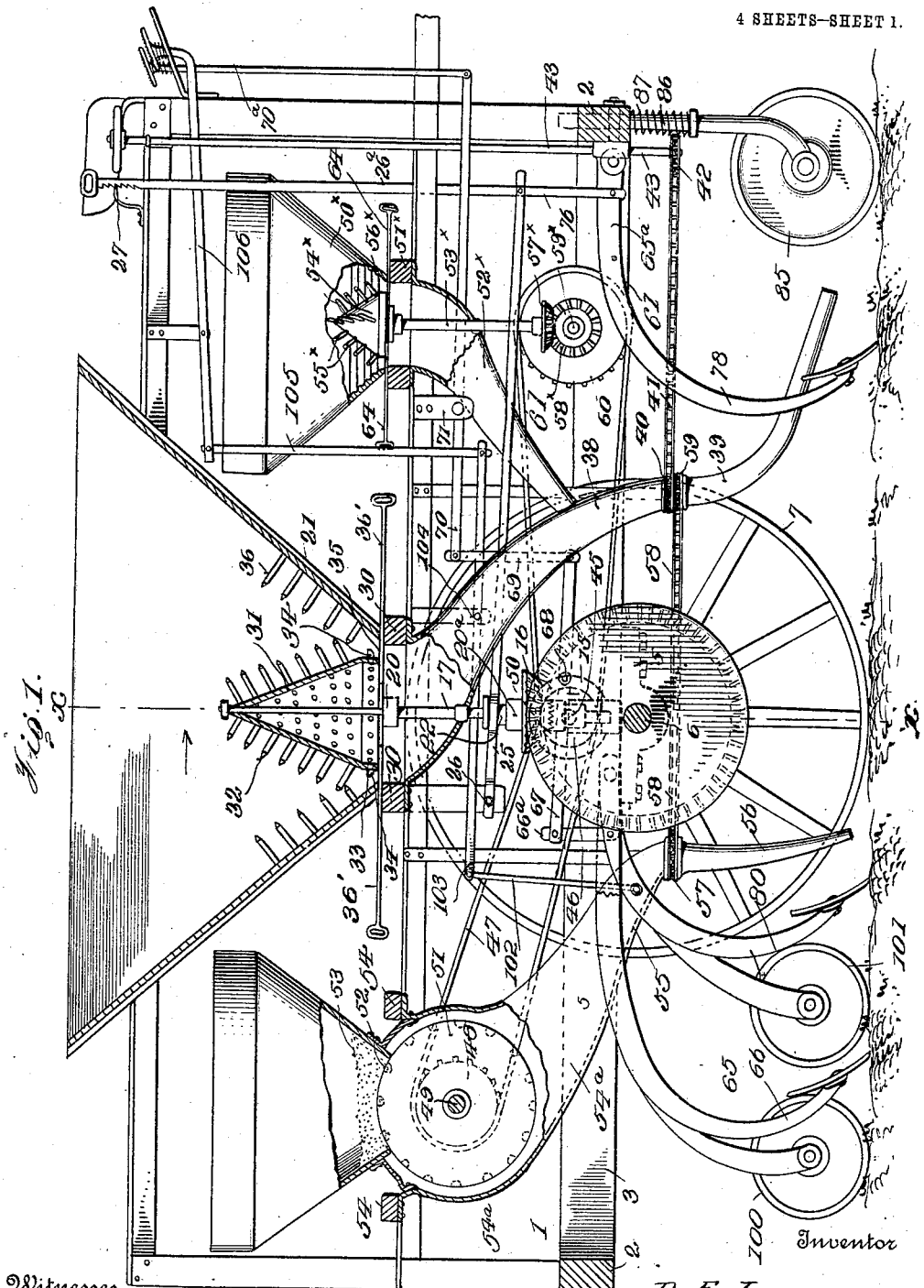
Figure 2:
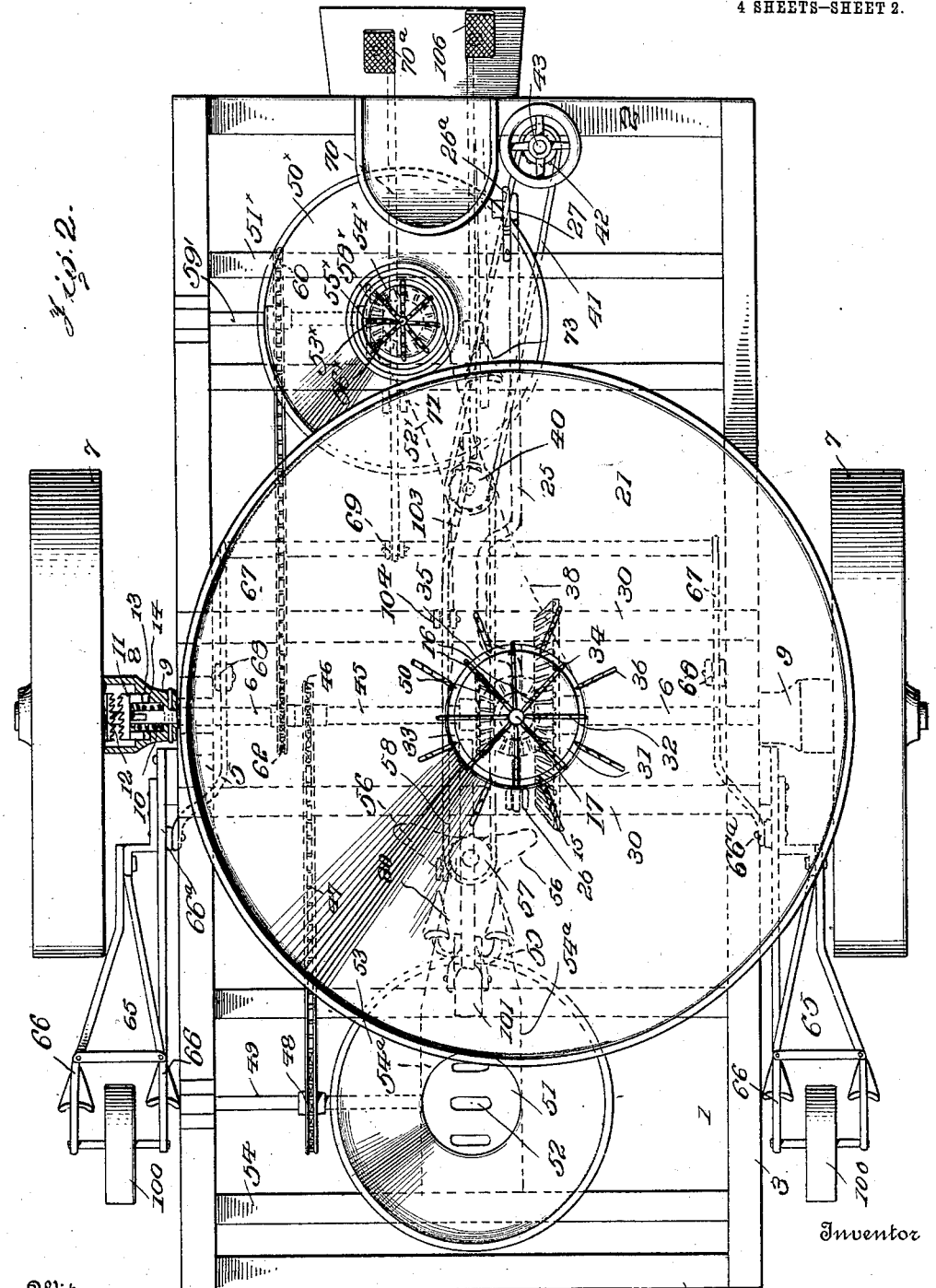
Figure 3:
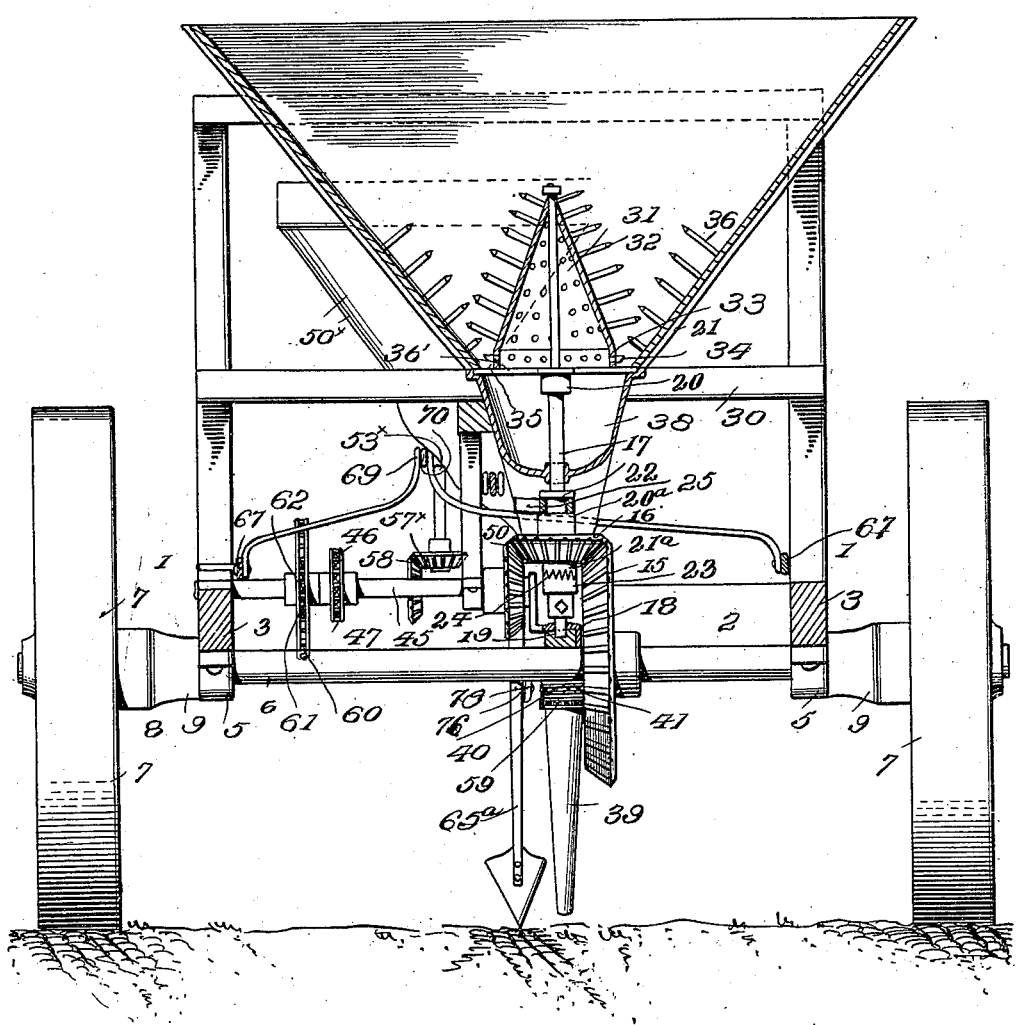

In the drawings, Figure 1 is an elevation, parts being shown in section. Fig. 2 is a top plan view. Fig. 3 is a transverse section on the line $x$—$x$, Fig. 1. Fig. 4 is an enlarged detail view of the main gearing. Fig. 5 is a detail section of the traction wheel clutch. Fig. 6 is a section of the same on the line 6—6, Fig. 5.

The same numerals refer to like parts in all the figures.

Fig. 1 represents a frame composed of two end beams 2, connected by side bars 3, and vertical and horizontal angle irons mounted on said beams and bars 2 and 3. Supported in bearings 5, secured to side bars 3 is a main driving shaft or axle 6 carrying at its outer end traction wheels 7—7. Between each traction wheel and shaft 6, is arranged a clutch indicated at 8, and comprising a sleeve 9 formed with a cavity to form a seat for a spring 10 encircling the shaft and adapted to force outwardly a disk 11, on the outer face of which is series of teeth which coöperate with a series of similar oppositely faced teeth 12, on the hub of the traction wheel. The disk 11, is formed with a series of wings 13 which slide in grooves 14 in the hub 9 to cause the same to turn with said hub to impart the necessary motion through the clutch to the traction wheels. Obviously the purpose of this construction is to permit the apparatus to turn conveniently when rounding a sharp corner, or to permit backing of the apparatus without causing the mechanism to be thrown into operation.

Secured on the shaft 6, near the center is a large beveled gear wheel 15, which meshes with a smaller beveled gear 16, mounted on a vertical shaft 17. The lower end of the shaft is mounted in a bearing 18 secured to a beam 19, forming part of the main frame, and the upper end of said shaft is secured in a bearing 20, fastened to a hopper 21. The beveled gear wheel 16, is provided with a vertical movable sleeve 20ª, having at its lower end a series of ratchet teeth 21ª, and at its upper end a groove 22. Fastened on the vertical shaft 17, below the sleeve 20ª, is a collar 23, provided with ratchet teeth 24, which coöperate with the teeth 21ª, to cause the beveled gear wheel 16 to revolve with the shaft.

Engaging with the groove 22, of the sleeve 20ª is a lever 25, pivoted at 26, to a depending arm and extending forwardly and is connected to a lever 26ª, provided with means, indicated at 27, for holding it in adjusted position. Obviously by raising the lever, the sleeve 20ª, will be lifted to disengage the ratchet teeth and thereby prevent the revolving of the vertical shaft 17.

The hopper 21, is designed to hold compost and is suitably supported on sills, 30, extending across the main frame of the machine. On the upper end of the vertical shaft 17, and within the hopper 21, is a cone 31, which is provided with a spirally arranged series of outwardly projecting spikes or teeth 32, to agitate the compost and feed the same downwardly the lower ends of the cone being planed vertically as shown at 33, and projecting outwardly from this surface 33, are short pins or spikes 34, located directly over a space 35, formed between the surface 33, and the inner wall of the hopper 21, whereby to permit the passage of the compost from the hopper. Extending inwardly and upwardly from the inner walls of the hopper are a series of stationary spikes or pins 36, which coöperate with the pins 32, to assist in agitating and crushing the compost so it will readily pass through the opening 35. The opening 35 may be regulated by valves indicated at 36' each having a handle by which it may be manipulated at will. Secured to the sills 30, and extending downwardly and forwardly under the hopper 21, is a spout 38, into which the compost passes as it falls through the opening 35. The lower end of the spout 38, is provided with a swinging section 39, so it may be turned to deliver the compost in the path of either the traction wheels 7, or in a plane with the approximate center of the machine. The swinging section 39, is provided with a sprocket wheel 40, connected by a chain 41, with a sprocket wheel 42, on a vertical shaft 43, located near the front of the machine and in convenient reach of the driver, and having at its upper end a hand wheel, whereby upon turning of the shaft 43, the section 39, may be shifted to the desired position when planting.

Mounted in bearings on the longitudinal side bars 3, is a transverse shaft 45, provided with a sprocket wheel 46, around which passes a sprocket chain 47, which also passes around a sprocket wheel 48, secured on a shaft 49, mounted in bearing in the main frame. On the inner end of the shaft 45, is beveled gear wheel 50, which meshes with the beveled gear wheel 16. On the shaft 49, is mounted a seed disk 51, provided on its periphery with a series of pockets 52 designed to receive seed from a hopper 53, mounted on sills 54 supported on the main frame. The upper surface of the disk 51, fits in the bottom of the hopper 53, and as it revolves, the seed falls into the pockets and is carried around within a housing 54$^a$, from the bottom of which leads a spout 55, which conveys the seed to the proper point for planting. The lower end of the spout 55, is provided with a movable section 56, which may be turned so as to direct the seed to the plane of the center of the machine or in line with either of the traction wheels. This section 56 is revolved by means of a sprocket wheel 57, and a sprocket chain 58, passing around a second sprocket wheel 59, on the shaft which carries the sprocket wheel 40. Obviously by this connection when the shaft 43 is turned to operate the movable section 39, of the spout 38, the movable section 56 of spout 55 will be simultaneously turned to bring the two sections into proper alinement when planting.

Mounted in the main frame in front of the hopper 21, is an acid hopper 50$^x$, supported on cross sills 51$^x$, and communicating with its bottom is a spout 52$^x$, which communicates with the spout 38, extending from the compost hopper. Extending vertically through the bottom of the spout 52$^x$, and the hopper 50$^x$, is a shaft, 53$^x$, provided on its upper end with a cone 54$^x$ from the edges of which extends a plurality of upwardly and outwardly inclined spikes 55$^x$. The lower portions of the cone 54$^x$, is vertical and fits in the opening in the bottom of the hopper, and is slightly spaced from the sides thereof to form a passageway 56$^x$, through which the acid passes to the spout 52$^x$. To the lower end of the shaft 53$^x$, is secured a beveled pinion 57$^x$ which meshes with a beveled pinion 58, mounted on the shaft 59$^x$, in bearings on the side bars 3. On the shaft 59$^x$, is mounted a sprocket wheel 60, around which passes a sprocket chain 61, which in turn passes around the sprocket wheel 62 on the shaft 45, whereby motion is imparted to the cone to agitate and pulverize the acid to cause it to flow freely from the opening 56$^x$, through the spout 52$^x$, at the time the compost is fed through the spout 38. It will be observed that both the compost and the acid are delivered to the soil through the movable section 39, of the spout 38, whereby a thorough mixture of these elements takes place. The openings 56$^x$ are controlled by valves 64, as shown clearly in the drawings.

To each of the side bars 3, is attached a furrow opener 65, the same being provided with two standards 66, located in the plane of the traction wheel 7 and which are designed to receive shovels or coverers as the case may be. Also a furrow opener 65$^a$ is located in front of the spout to mix the soil and compost. The furrow openers 65, are each operated by a system of levers to raise and lower the same as the circumstances may require. A link 66$^a$, is attached to each furrow opener and it is pivotally connected to a lever 67, pivoted at 68, and at its front end it is connected by a link 69, pivoted at its upper end to a lever 70, pivoted to a standard 71, on the main frame and connected at its front end to the operating handle 70$^a$ in convenient reach of the driver. Obviously by raising the operating lever 70$^a$ the system of levers will be moved so as to raise or lower each of the furrow openers.

Pivoted to the hand lever 26$^a$, is a link 76, which in turn is pivoted to the furrow opener 65$^a$, which comprises a standard 78, arranged in the plane of the center of the machine so as to coöperate with the movable sections 39, and 56 of the spouts 38 and 55. Another furrow opener 80, is located in the rear of and in the plane of the furrow opener 65$^a$ to coöperate with the latter when planting from the middle of the machine.

On the front of the machine is a caster wheel 85 mounted on a vertical shaft 86, there being a spring 87 interposed between a collar on the shaft and the frame of the machine whereby the wheel will readily yield to the inequalities of the ground as the machine is pulled over the surface.

In operation, the soil is first cultivated, the apparatus with the seed, compost and acid, in the respective hoppers is drawn over the ground, power being imparted from the traction wheels 7, to the shaft 6 and the beveled gears. Assuming the ratchet teeth 21$^a$ and 24 are thrown into operative position power will be imparted to the vertical shaft 17 which will revolve the agitators and cause the compost to be fed through the opening 35, to the spout 38. At the same time, the shaft 49 is revolved through the medium of the gear 50, and by means of the sprockets and chain connections from said shaft, power is imparted to the disk 51, in the seed hopper and the cone 54$^x$, in the acid hopper, thereby causing the seed to fall from the spout 55, and the acid to fall through the spout 52$^x$. During this operation the movable sections 56 and 39 are manipulated so as to direct the seed and the mixture of compost and acid either in the plane of the respective traction wheels, or to the center of the machine, as the case may be. The respective furrow openers are also operated through the system of levers described, so that they will be located in operative position to coöperate with the location of the position of the respective sections 39, and 56, whereby the soil is worked in accordance with the location of the dropping of the seed and the fertilizing mixture.

With a machine of this type it is evident that the ground can be fertilized at the time the seed is planted with little or no inconvenience, and in a most economical manner.

The arrangement of the various furrow openers and the sectional formation of the spouts enables the operator to manipulate the parts in such a way that a row can be conveniently planted and the ground fertilized in any one of three different rows. The parts are so arranged that the mixture of compost and acid is intetrmixed in the soil before the seed is planted so as to enrich the ground in which the seed is subsequently embedded. The side furrow-openers will be provided with covering wheels 100 to pack the soil after the seed and fertilizing mixture have been deposited. The furrow-opener 80 will also be provided with a covering wheel 101. This furrow opener may be raised and lowered by a link 102 connected to a lever 103, pivoted at 104, and pivoted at its opposite end to a link 105, which is pivoted to a foot treadle 106.

Claims.

1. In combination, a frame, a seed hopper provided with feeding means, and a spout, a movable section at the end of the spout, a compost hopper mounted in the frame and provided with feeding means, a spout communicating with the hopper, a movable section at the end of the spout and an acid hopper mounted in the frame, and provided with feeding means, a spout leading from the acid hopper to the compost spout above the plane of the movable section of the compost spout, means for operating the feeding means in the respective hoppers and means for simultaneously operating the movable sections of the two spouts.

2. In a machine of the class described, the combination with a frame, a seed hopper provided with feeding means, a spout communicating with the hopper, a compost hopper mounted in the frame and provided with feeding means, a spout communicating with the compost hopper, an acid hopper mounted in the frame and provided with feeding means, a spout communicating with the acid hopper and also communicating with the spout from the compost hopper, means for operating the feeding means in the respective hoppers, traction wheels supporting the frame, furrow openers coöperating with the ends of the two spouts, means for raising and lowering the furrow openers independently of each other, gearing between the traction wheels and the feeding means for operating the latter.

3. In a machine of the class described, the combination with a frame, an axle on the frame, traction wheels on the axle, a gear wheel on the axle, a compost hopper, a spout leading therefrom, feeding means therein, a vertical shaft extending from the feeding means, a gear wheel on the vertical shaft which meshes with the gear wheel on the axle, a horizontal shaft adjacent the vertical shaft, a gear wheel on the horizontal shaft meshing with the gear wheel on the vertical shaft, a clutch for engaging and disengaging the gear wheel on the vertical shaft, a seed hopper mounted in the frame and provided with feeding means, a vertical shaft extending from the latter feeding means, gears for operating the vertical shaft, means for imparting motion through the horizontal shaft to the gears, an acid hopper supported in the frame and provided with feeding means, a spout leading from the acid hopper to the compost spout, a vertical shaft connected to the feeding means in the acid hopper, gears for operating the vertical shaft of the acid hopper, means between the gears and the horizontal shaft for operating the gears, a furrow opener supported on the frame and located in the plane of one of the traction wheels, a second furrow opener located on the frame and in the plane of the other traction wheel, means for independently raising and lowering each of the furrow openers, a furrow opener in the plane of the center of the machine and means for raising and lowering the latter furrow opener.

4. In a machine of the class described, the combination with a frame, a horizontal shaft supported thereon, traction wheels on the axle, a compost hopper supported in the frame, a cone-shape base forming a part of the feeding means in the compost hopper and provided on its outer surface with a plurality of spirally arranged spikes, the cone being spaced from the side walls of the hopper to provide an exit for the compost, valves for controlling the space, a vertical shaft depending from the cone, a beveled gear on the shaft, a clutch for connecting and disconnecting the beveled gear to the shaft, a gear wheel on the axle for meshing with the beveled gear on the vertical shaft, a series of inwardly projecting spikes in the hopper to coöperate with the spikes on the cone for agitating and breaking the compost into finer particles, a spout depending from the compost hopper, and a movable section on the end of the compost hopper, a second hopper mounted in the frame and provided with feeding means, a spout leading from the second hopper to the spout of the compost hopper above the movable section thereof, valves for controlling the exit of material from the second hopper, seed mechanism supported in the frame and provided with a spout to coöperate with the spout from the compost hopper, means for operating the seeding mechanism, means for operating the feeding mechanism in the second mentioned hopper, furrow openers coöperating with the spouts, and means for raising and lowering the furrow openers.

5. The combination with a frame, seeding mechanism provided with a spout having a movable section at its lower end, compost mechanism having a spout provided with a movable section, an acid feeding mechanism supported in the frame and provided with a spout which communicates with the spout of the compost mechanism above the movable section thereof, a sprocket wheel on each of the movable sections, a shaft supported in the frame, a sprocket wheel on the shaft, a sprocket chain passing around the sprocket wheel on the vertical shaft and one of the sprocket wheels on one of the movable sections and a sprocket chain passing around the sprocket wheels on the respective sections whereby said sections are simultaneously moved when the shaft is operated.

In testimony whereof I have signed my name to this specification in the presence of two subscribing witnesses.

DAVID E. LAWRENCE.

Witnesses:
CRAYTON G. MULLINNEX,
JOHN R. FALLS.